United States Patent
Ooami

(10) Patent No.: US 12,145,571 B2
(45) Date of Patent: Nov. 19, 2024

(54) INTERNAL COMBUSTION ENGINE START CONTROL APPARATUS AND NON-TRANSITORY RECORDING MEDIUM

(71) Applicant: SUBARU CORPORATION, Tokyo (JP)

(72) Inventor: Natsumi Ooami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1 day.

(21) Appl. No.: 18/319,092

(22) Filed: May 17, 2023

(65) Prior Publication Data

US 2023/0391312 A1    Dec. 7, 2023

(30) Foreign Application Priority Data

Jun. 2, 2022   (JP) .................................. 2022-090461

(51) Int. Cl.
| | | |
|---|---|---|
| *B60W 20/15* | (2016.01) | |
| *B60W 50/06* | (2006.01) | |
| *F02D 41/06* | (2006.01) | |

(52) U.S. Cl.
CPC ............ *B60W 20/15* (2016.01); *B60W 50/06* (2013.01); *F02D 41/062* (2013.01); *B60W 2540/10* (2013.01); *F02D 2200/60* (2013.01)

(58) Field of Classification Search
None
See application file for complete search history.

(56) References Cited

U.S. PATENT DOCUMENTS

| | | | | |
|---|---|---|---|---|
| 6,540,644 | B2 * | 4/2003 | Morimoto | F02N 11/084 |
| | | | | 903/917 |
| 11,623,631 | B2 * | 4/2023 | Hawley | B60W 40/08 |
| | | | | 701/22 |
| 2019/0249614 | A1 * | 8/2019 | Suzuki | F02D 41/18 |
| 2019/0322279 | A1 * | 10/2019 | Awadi | B60W 10/11 |
| 2020/0191069 | A1 * | 6/2020 | Naidu | F02D 41/2451 |

FOREIGN PATENT DOCUMENTS

JP       2020-15476 A    1/2020

* cited by examiner

*Primary Examiner* — Carl C Staubach
(74) *Attorney, Agent, or Firm* — Rimon P.C.

(57) ABSTRACT

An internal combustion engine start control apparatus includes one or more processors and one or more memories communicably coupled thereto. The one or more processors: generate a stop request for an internal combustion engine when an accelerator position based on an operation by a driver is less than a predetermined position threshold, and a start request for the internal combustion engine when the accelerator position becomes the position threshold or greater; learn an accelerator operation characteristic of the driver exhibited when a vehicle starts or accelerates; and execute, based on a result of learning the accelerator operation characteristic, a first start process of starting the internal combustion engine when the accelerator position becomes the position threshold or greater, and a second start process of starting the internal combustion engine after a state in which the accelerator position is the position threshold or greater continues for a predetermined time period.

5 Claims, 7 Drawing Sheets

INTERNAL COMBUSTION ENGINE START CONTROL APPARATUS AND NON-TRANSITORY RECORDING MEDIUM

CROSS-REFERENCE TO RELATED APPLICATIONS

The present application claims priority from Japanese Patent Application No. 2022-090461 filed on Jun. 2, 2022, the entire contents of which are hereby incorporated by reference.

BACKGROUND

The disclosure relates to an internal combustion engine start control apparatus and a non-transitory recording medium that control start of an internal combustion engine mounted on a hybrid vehicle.

A known hybrid vehicle includes a drive motor and an internal combustion engine as driving force sources of the vehicle such as an automobile. One mode of a hybrid vehicle system is a system configured to stop the internal combustion engine while the vehicle is at a stop or traveling based on very small requested driving torque, and start the internal combustion engine when the requested driving torque increases, to allow the drive motor and the internal combustion engine to output the requested driving torque in cooperation with each other. In the hybrid vehicle, electric-powered traveling based on an output of the drive motor is preferentially performed, which makes it possible to improve fuel economy.

In such a hybrid vehicle, conditions for start of the stopped internal combustion engine include a depression operation on an accelerator pedal performed by a driver. In other words, when a depression operation on the accelerator pedal is performed, a control apparatus starts the internal combustion engine because it is possible to determine that the driver requests driving torque for the vehicle. For example, Japanese Unexamined Patent Application Publication No. 2020-15476 discloses a hybrid vehicle that starts an internal combustion engine when an accelerator position requested of the vehicle becomes equal to or greater than a predetermined threshold during electric-powered traveling.

SUMMARY

An aspect of the disclosure provides an internal combustion engine start control apparatus configured to control start of an internal combustion engine in a vehicle. The vehicle includes a drive motor and the internal combustion engine as driving force sources. The internal combustion engine start control apparatus includes one or more processors and one or more memories. The one or more memories are communicably coupled to the one or more processors. The one or more processors are configured to execute an engine start and stop determination process of generating a stop request for the internal combustion engine when an accelerator position based on an operation by a driver who drives the vehicle is less than a predetermined position threshold, and generating a start request for the internal combustion engine when the accelerator position becomes equal to or greater than the predetermined position threshold. The one or more processors are configured to execute a learning process of learning an accelerator operation characteristic of the driver exhibited when the vehicle starts or accelerates. The one or more processors are configured to execute an internal combustion engine start process of executing, based on a result of learning the accelerator operation characteristic, a first start process of starting the internal combustion engine when the accelerator position becomes equal to or greater than the predetermined position threshold, and a second start process of starting the internal combustion engine after a state in which the accelerator position is equal to or greater than the predetermined position threshold continues for a predetermined time period.

An aspect of the disclosure provides a non-transitory computer readable recording medium containing a computer program to be applied to an internal combustion engine start control apparatus. The internal combustion engine start control apparatus is configured to control start of an internal combustion engine in a vehicle. The vehicle includes a drive motor and the internal combustion engine as driving force sources. The computer program causes, when executed by one or more processors, the one or more processors to implement a method. The method includes: generating a stop request for the internal combustion engine when an accelerator position based on an operation by a driver who drives the vehicle is less than a predetermined position threshold, and a start request for the internal combustion engine when the accelerator position becomes equal to or greater than the predetermined position threshold; learning an accelerator operation characteristic of the driver exhibited when the vehicle starts or accelerates; and executing, based on a result of learning the accelerator operation characteristic, a first start process of starting the internal combustion engine when the accelerator position becomes equal to or greater than the predetermined position threshold, and a second start process of starting the internal combustion engine after a state in which the accelerator position is equal to or greater than the predetermined position threshold continues for a predetermined time period.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
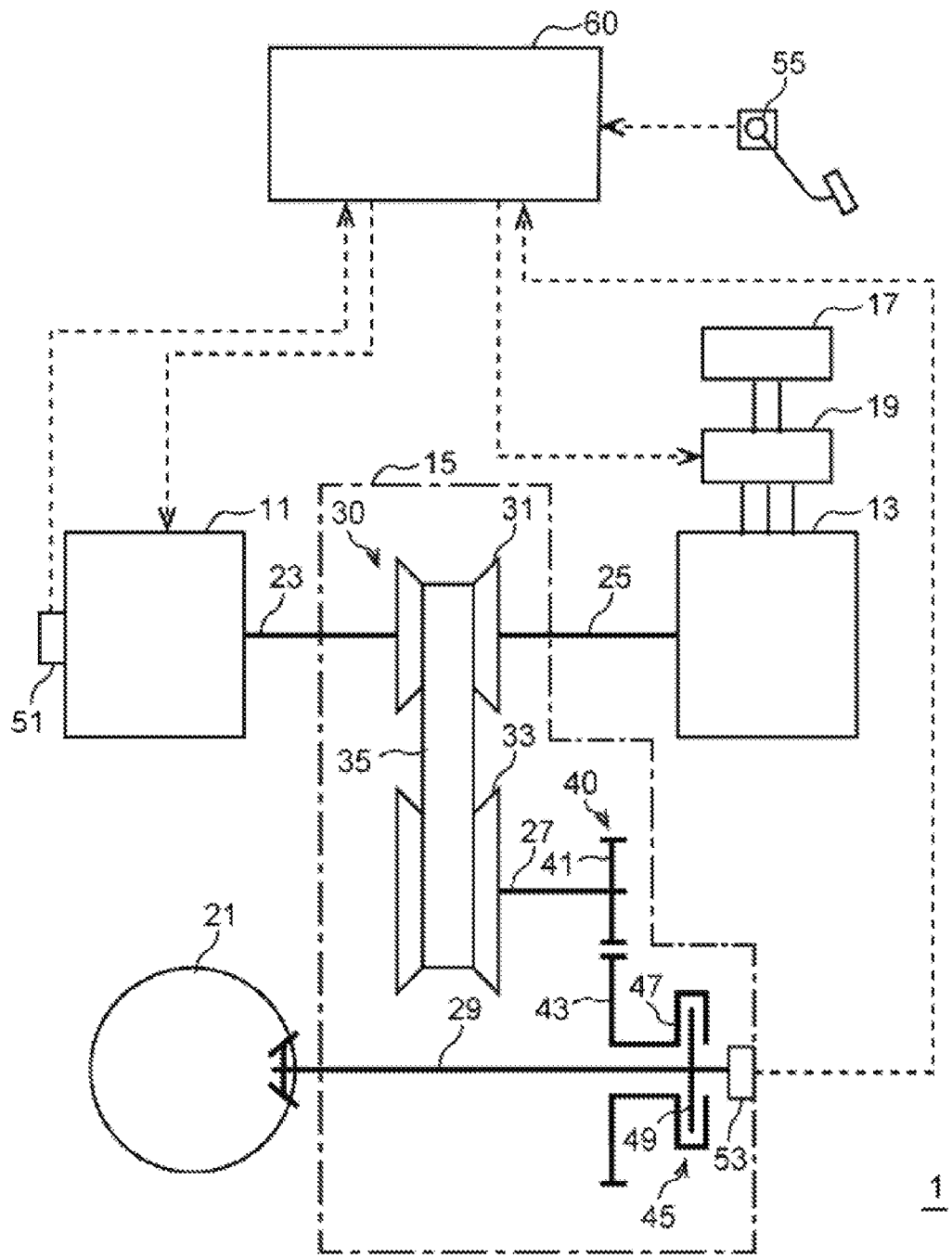
FIG. 1 is a schematic diagram illustrating a configuration example of a vehicle including an internal combustion engine start control apparatus according to one example embodiment of the disclosure.

It is known that an operation performed on an accelerator pedal by a driver exhibits an operation characteristic not related to a driving skill. Examples of the operation characteristic of the operation on the accelerator pedal include the following three characteristics. The operation characteristic of the operation on the accelerator pedal is also referred to as an "accelerator operation characteristic".

A first characteristic: a characteristic indicating an operation in which an amount of depression at the start of a depression operation is large, but a maximum value of the amount of depression is suppressed to a predetermined degree, and thereafter a change in the amount of depression is small.

A second characteristic: a characteristic indicating an operation in which the amount of depression is relatively small throughout the operation on the accelerator pedal, but the change in the amount of depression fluctuates greatly.

A third characteristic: a characteristic indicating an operation in which the amount of depression gradually increases at the start of the depression operation, and suddenly decreases after the maximum value becomes large, and thereafter the change in the amount of depression is small.

When a driver having the above-described third characteristic performs a depression operation on the accelerator pedal, an accelerator position greatly exceeds the originally desired accelerator position. Consequently, even though the accelerator position originally desired by the driver is less than a predetermined threshold for start of an internal combustion engine, the accelerator position exceeds the predetermined threshold as a result of the depression operation, causing the internal combustion engine to be started more easily as compared with for a driver having another accelerator operation characteristic.

It is desirable to provide an internal combustion engine start control apparatus and a non-transitory recording medium containing a computer program that make it possible to suppress start of an internal combustion engine unintended by a driver.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Features of Embodiments of Disclosure (1-1) An embodiment of the disclosure is an internal combustion engine start control apparatus configured to control start of an internal combustion engine in a vehicle, the vehicle including a drive motor and the internal combustion engine as driving force sources, the internal combustion engine start control apparatus including:

one or more processors; and one or more memories communicably coupled to the one or more processors, in which the one or more processors are configured to execute an engine start and stop determination process of generating a stop request for the internal combustion engine when an accelerator position based on an operation by a driver who drives the vehicle is less than a predetermined position threshold, and generating a start request for the internal combustion engine when the accelerator position based on the operation by the driver becomes equal to or greater than the predetermined position threshold, a learning process of learning an accelerator operation characteristic of the driver exhibited when the vehicle starts or accelerates, and an internal combustion engine start process of executing, based on a result of learning the accelerator operation characteristic, a first start process of starting the internal combustion engine when the accelerator position becomes equal to or greater than the predetermined position threshold, and a second start process of starting the internal combustion engine after a state in which the accelerator position is equal to or greater than the predetermined position threshold continues for a predetermined time period.

Note that the embodiments of the disclosure may be implemented by the internal combustion engine start control apparatus to be mounted on the vehicle to execute the processes described above, and also by a computer program for execution of the processes described above, a non-transitory recording medium containing the computer program, or an internal combustion engine start control method that executes the processes described above.

With the configuration described above, the internal combustion engine start control apparatus, the computer program, the non-transitory recording medium, or the internal combustion engine start control method according to any embodiment of the disclosure learns the accelerator operation characteristic when the driver who drives the vehicle depresses an accelerator pedal in a stopped state of the internal combustion engine, and varies start timing of the internal combustion engine based on the result of learning the accelerator operation characteristic. In one example, the internal combustion engine start control apparatus executes, in accordance with the accelerator operation characteristic of the driver, the first start process of starting the internal combustion engine when the accelerator position becomes equal to or greater than the predetermined position threshold, or the second start process of starting the internal combustion engine after the state in which the accelerator position is equal to or greater than the predetermined position threshold continues for the predetermined time period. Thus, when a driver having an accelerator operation characteristic in which an amount of depression becomes large at the start of a depression operation on the accelerator pedal depresses the accelerator pedal, it is possible to suppress the start of the internal combustion engine unintended by the driver. On the other hand, when a driver not having the accelerator operation characteristic in which the amount of depression becomes large at the start of the depression operation on the accelerator pedal greatly depresses the accelerator pedal, the internal combustion engine is appropriately started, making it possible to meet an acceleration request intended by the driver.

The "accelerator position" may indicate the amount of depression of the accelerator pedal. The "predetermined position threshold" may indicate a threshold for determination of the start of the internal combustion engine resulting from depression of the accelerator pedal by the driver. The "predetermined position threshold" may be set to, for example, a value of the accelerator position corresponding to a maximum value of requested driving torque achievable by driving torque outputted from the drive motor. When the accelerator position is equal to or greater than the "predetermined position threshold", the internal combustion engine may basically be started, and the requested driving torque may be achieved by the driving torque outputted from the drive motor and driving torque outputted from the internal combustion engine. Note that the internal combustion engine start control apparatus according to any embodiment of the disclosure is configured to set, in accordance with the accelerator operation characteristic of the driver, the start timing of the internal combustion engine when the accelerator position becomes equal to or greater than the predetermined position threshold.

The "accelerator operation characteristic" may indicate a habit exhibited when the driver performs a depression operation on the accelerator pedal. As described above, typical examples of the "accelerator operation characteristic" include the following three characteristics, but are not limited to the accelerator operation characteristics described below.

A first characteristic: a characteristic indicating an operation in which an amount of depression at the start of the depression operation is large, but a maximum value of the amount of depression is suppressed to a predetermined degree, and thereafter a change in the amount of depression is small.

A second characteristic: a characteristic indicating an operation in which the amount of depression is relatively small throughout the operation on the accelerator pedal, but the change in the amount of depression fluctuates greatly.

A third characteristic: a characteristic indicating an operation in which the amount of depression gradually increases at the start of the depression operation, and suddenly decreases after the maximum value becomes large, and thereafter the change in the amount of depression is small.

(1-2) In an embodiment of the disclosure, in the learning process, the one or more processors may be configured to determine a proportion, with respect to a number of times the accelerator position when the vehicle starts or accelerates becomes equal to or greater than the predetermined position threshold, of a number of times the accelerator position becomes less than the predetermined position threshold within a predetermined time threshold after becoming equal to or greater than the predetermined position threshold.

With this configuration, it is possible to determine a driver having the above-described third characteristic. This allows for accurate determination of the driver for which the second start process is to be executed as the internal combustion engine start process, making it possible to suppress the start of the internal combustion engine unintended by the driver. In addition, when a driver having another accelerator operation characteristic depresses the accelerator pedal, it is possible to promptly start the internal combustion engine.

(1-3) In an embodiment of the disclosure, in the internal combustion engine start process, the one or more processors may be configured to execute the first start process when the proportion is less than a predetermined proportion threshold, and execute the second start process when the proportion is equal to or greater than the predetermined proportion threshold.

With this configuration, it is possible to apply, to a driver who is highly likely to exhibit a large amount of depression at the start of a depression operation on the accelerator pedal, the second start process of starting the internal combustion engine after the state in which the accelerator position is equal to or greater than the predetermined position threshold continues for the predetermined time period.

(1-4) In an embodiment of the disclosure, in the second start process, the one or more processors may be configured to set a start suppression mode when the start request for the internal combustion engine is generated, cancel the set start suppression mode upon establishment of any one of a condition that a predetermined first time period elapses without the accelerator position becoming less than the predetermined position threshold after the start request for the internal combustion engine is generated, a condition that the accelerator position becomes less than the predetermined position threshold again before the predetermined first time period elapses after the start request for the internal combustion engine is generated, and thereafter a predetermined second time period elapses without the accelerator position becoming equal to or greater than the predetermined position threshold again, and a condition that the accelerator position becomes less than the predetermined position threshold again before the predetermined first time period elapses after the start request for the internal combustion engine is generated, and thereafter the accelerator position becomes equal to or greater than the predetermined position threshold again before the predetermined second time period elapses, and start the internal combustion engine when the set start suppression mode is canceled in a state in which the accelerator position is equal to or greater than the predetermined position threshold.

With this configuration, it is possible to determine that a driver who is highly likely to exhibit a large amount of depression at the start of a depression operation on the accelerator pedal has an intention of rapidly increasing the driving torque (hereinafter also referred to as a "torque rapid increase intention"), and start the internal combustion engine. This makes it possible to prevent a situation in which the internal combustion engine is not started even though the driver has the torque rapid increase intention.

2. Configuration of Vehicle

With reference to FIG. 1, description is given of a configuration of a vehicle including an internal combustion engine start control apparatus according to an example embodiment of the disclosure. FIG. 1 is a schematic diagram illustrating a configuration of a hybrid vehicle 1. The hybrid vehicle 1 is hereinafter also simply referred to as a "vehicle 1". The vehicle 1 may include an internal combustion engine 11, a drive motor 13, a transmission 15, a battery 17, an inverter 19, a wheel 21, and a control apparatus 60. The vehicle 1 may be a hybrid vehicle in which the internal combustion engine 11 and the drive motor 13 serving as driving force sources are provided in parallel.

The internal combustion engine 11 may be, for example, a gasoline engine or a diesel engine. A crank shaft 23 serving as an output shaft of the internal combustion engine 11 may be coupled to the transmission 15. The internal combustion engine 11 may generate a driving force by combustion of fuel, and output the driving force via the crank shaft 23. The crank shaft 23 may transmit the driving force outputted from the internal combustion engine 11 to the transmission 15. The internal combustion engine 11 may include an engine speed sensor 51 that detects a rotation speed of the crank shaft 23.

The drive motor 13 may be, for example, a three-phase alternating current motor. A motor rotating shaft 25 serving as an output shaft of the drive motor 13 may be coupled to the transmission 15. The crank shaft 23 and the motor rotating shaft 25 may be coupled to each other via the transmission 15. The battery 17 may be an electric power source that stores electric power to be supplied to the drive motor 13, and may be electrically coupled to the inverter 19. The inverter 19 may be electrically coupled to the drive motor 13. The inverter 19 may convert electric power of and the battery 17 into three-phase alternating-current electric power, and supply the resulting electric power to the drive motor 13. The drive motor 13 may use the electric power supplied via the inverter 19 to rotate the motor rotating shaft 25. The drive motor 13 may output a driving force via the motor rotating shaft 25. The motor rotating shaft 25 may transmit the driving force outputted from the drive motor 13 to the transmission 15.

The transmission 15 may be provided between the shafts, i.e., the crank shaft 23 and the motor rotating shaft 25, and the wheel 21. The transmission 15 may perform shifting of the rotation speed of the crank shaft 23 and the motor rotating shaft 25, and transmit driving torque outputted from the internal combustion engine 11 and the drive motor 13 to the wheel 21. The transmission 15 may include a transmission mechanism 30, a secondary shaft 27, a secondary gear mechanism 40, an output clutch 45, and an output shaft 29. The transmission mechanism 30 may be a continuously variable transmission mechanism in the example embodiment, but may be a stepped transmission mechanism.

The transmission mechanism 30 may include a primary pulley 31, a secondary pulley 33, and a transmission belt 35. The transmission belt 35 may be wound around the primary pulley 31 and the secondary pulley 33. The transmission belt 35 may transmit rotation of the primary pulley 31 to the secondary pulley 33, to rotate the secondary pulley 33 in accordance with the rotation of the primary pulley 31. The transmission mechanism 30 may be able to adjust a ratio of a rotation speed of the secondary pulley 33 to a rotation speed of the primary pulley 31, by changing respective pulley widths of the primary pulley 31 and the secondary pulley 33.

The crank shaft 23 and the motor rotating shaft 25 may be coupled to the primary pulley 31. The primary pulley 31 may rotate at the same rotation speed as the rotation speed of the crank shaft 23 and the rotation speed of the motor rotating shaft 25. In other words, the primary pulley 31, the crank shaft 23, and the motor rotating shaft 25 may rotate integrally. Note that an unillustrated clutch mechanism may be provided at any intermediate position of the crank shaft 23 or the motor rotating shaft 25, and configured to cut off the coupling of the internal combustion engine 11 or the drive motor 13 to the primary pulley 31.

The secondary shaft 27 may be coupled to the secondary pulley 33. The secondary shaft 27 may rotate at the same rotation speed as the rotation speed of the secondary pulley 33. In other words, the secondary pulley 33 and the secondary shaft 27 may rotate integrally. The rotation speed of the secondary shaft 27 may be reduced relative to the rotation speed of the crank shaft 23 and the motor rotating shaft 25 by the transmission mechanism 30.

The secondary gear mechanism 40 may include a first secondary gear 41 and a second secondary gear 43. The secondary shaft 27 may be coupled to the first secondary gear 41. The first secondary gear 41 may rotate at the same rotation speed as the rotation speed of the secondary shaft 27. The first secondary gear 41 and the second secondary gear 43 may be in mesh with each other. A rotation speed of the second secondary gear 43 may be reduced relative to the rotation speed of the first secondary gear 41.

The output clutch 45 may include a first clutch plate 47 and a second clutch plate 49. The second secondary gear 43 may be coupled to the first clutch plate 47. The first clutch plate 47 may rotate integrally with the second secondary gear 43. The output shaft 29 may be coupled to the second clutch plate 49. The output shaft 29 may be coupled to the wheel 21.

When the first clutch plate 47 and the second clutch plate 49 are engaged, power may be transmitted from the second secondary gear 43 to the output shaft 29. In this case, the output shaft 29 may rotate at the same rotation speed as the second secondary gear 43. The wheel 21 may rotate in accordance with the rotation of the output shaft 29. The transmission 15 may include an output rotation speed sensor 53 that detects the rotation speed of the output shaft 29.

The control apparatus 60 may serve as an apparatus that executes driving force control on the hybrid vehicle, by allowing one or more processors such as a central processing unit (CPU) to execute a computer program. For example, the control apparatus 60 may serve as the internal combustion engine start control apparatus that controls start of the internal combustion engine 11. The computer program may cause the processor to execute later-described operation to be executed by the control apparatus 60. The computer program to be executed by the processor may be recorded in a non-transitory recording medium that serves as a memory provided in the control apparatus 60. In other examples, the computer program may be recorded in a non-transitory recording medium built in the control apparatus 60 or any non-transitory recording medium externally attachable to the control apparatus 60.

The non-transitory recording medium that holds the computer program may be: a magnetic medium such as a hard disk, a floppy disk, or a magnetic tape; an optical recording medium such as a compact disk read only memory (CD-ROM), a digital versatile disk (DVD), a solid state drive (SSD), or a Blu-ray (registered trademark); a magnetic-optical medium such as a floptical disk; a storage device such as random access memory (RAM) or read only memory (ROM); a flash memory such as a universal serial bus (USB) memory; or any other medium that is able to hold programs.

The control apparatus 60 may receive sensor signals from the engine speed sensor 51 and the output rotation speed sensor 53. The control apparatus 60 may also receive a sensor signal from an accelerator sensor 55 that detects an amount of depression of an accelerator pedal (i.e., an accelerator position).

3. Control Apparatus (Internal Combustion Engine Start Control Apparatus)

Figure 2:
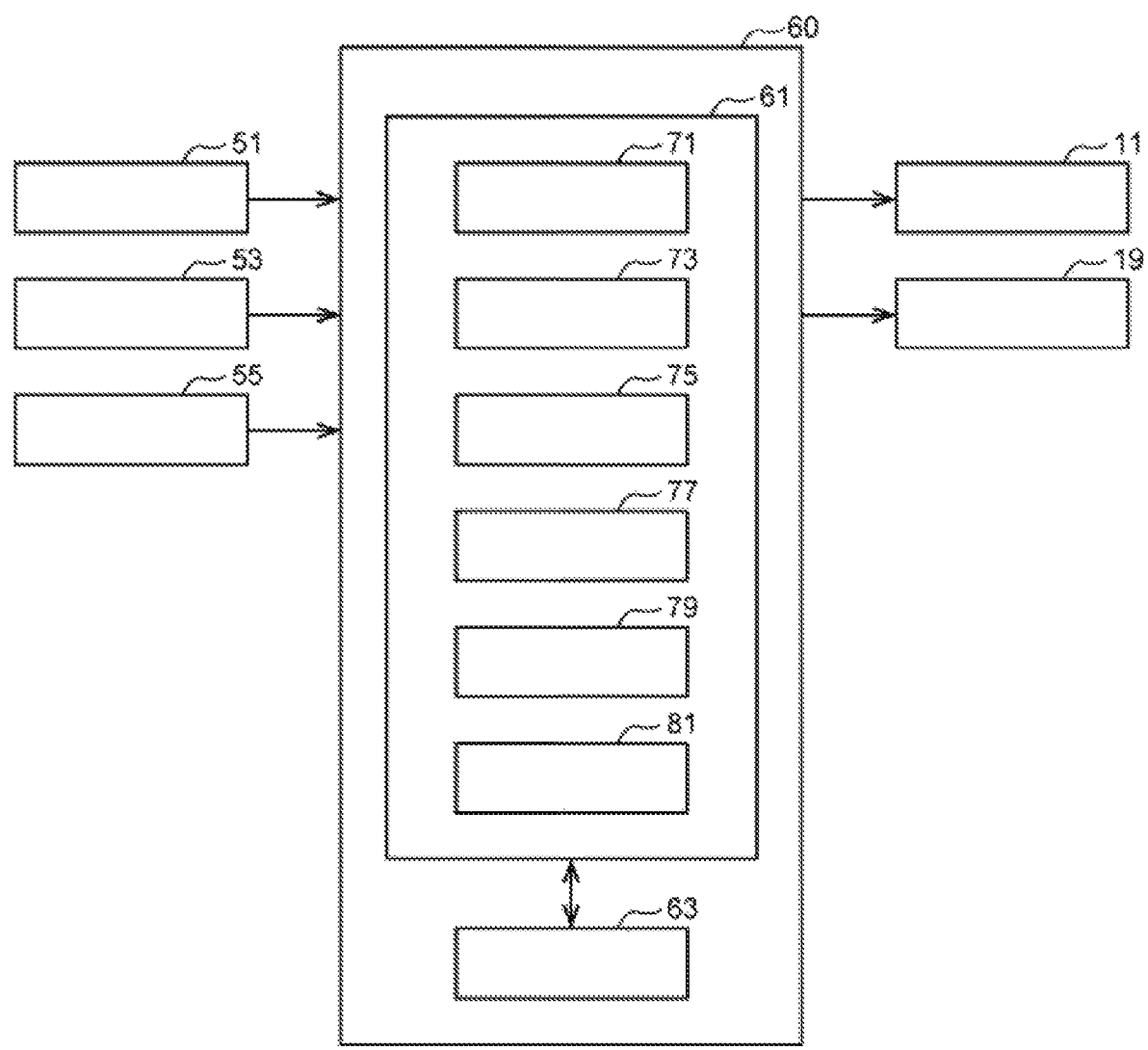
FIG. 2 is a block diagram illustrating a configuration of the control apparatus (i.e., the internal combustion engine start control apparatus) according to one example embodiment.

Next, detailed description is given of a configuration example of the control apparatus 60. FIG. 2 is a block diagram illustrating a configuration of the control apparatus 60.

The control apparatus 60 may include a processor 61 and a storage 63. The processor 61 may include one or more processors. The processor 61 may execute a process of controlling driving of the internal combustion engine 11 and the drive motor 13. A portion or all of the processor 61 may be configured to be updatable by, for example, firmware. A portion or all of the processor 61 may be, for example, a program module to be executed in accordance with a command from a device such as a CPU. The storage 63 may include one or more memories such as RAM or ROM communicably coupled to the processor 61. The storage 63 may hold the computer program to be executed by the processor 61, various parameters to be used in calculation processing, and data on calculation results. Note that there is no particular limitation on the number and kind of the storage 63.

The processor 61 may include an accelerator position determination unit 71, an engine start and stop determination unit 73, a learning unit 75, a requested driving torque calculation unit 77, an internal combustion engine control unit 79, and a motor control unit 81. An operation of each of these units may be implemented by execution of the computer program by the processor. Note that a portion of each unit may include hardware such as an analog circuit.

[3-1. Accelerator Position Determination Unit]

The accelerator position determination unit 71 may execute an accelerator position determination process of determining an amount of operation (i.e., the accelerator position) of the accelerator pedal to be operated by a driver who drives the vehicle 1. In one example, the accelerator position determination unit 71 may determine the accelerator position, based on the sensor signal received from the accelerator sensor 55.

[3-2. Engine Start and Stop Determination Unit]

The engine start and stop determination unit 73 executes an engine start and stop determination process of generating a stop request for the internal combustion engine 11 when the accelerator position based on the operation by the driver is less than a predetermined position threshold, and generating a start request for the internal combustion engine 11 when the accelerator position based on the operation by the driver becomes equal to or greater than the predetermined position threshold.

In one example, the accelerator position determination unit 71 may generate the stop request for the internal combustion engine 11 when the accelerator position based on the operation by the driver is less than the predetermined position threshold, and cause the vehicle 1 to travel using the driving force outputted from the drive motor 13. This mode is also referred to as an electric-powered traveling mode. On the other hand, the accelerator position determination unit 71 may generate the start request for the internal combustion engine 11 when the accelerator position based on the operation by the driver becomes equal to or greater than the predetermined position threshold, and cause the vehicle 1 to travel using the driving force outputted from the internal combustion engine 11 and the driving force outputted from the drive motor 13. This mode is also referred to as a hybrid traveling mode. As a result, in the vehicle 1 of the example embodiment, the electric-powered traveling mode may be set when requested driving torque for the vehicle 1 intended by the driver is small, and the mode may be switched to the hybrid traveling mode when the requested driving torque for the vehicle 1 intended by the driver becomes large.

In the example embodiment, when an increase speed of the accelerator position becomes equal to or greater than a predetermined threshold in a situation in which the internal combustion engine 11 is stopped, the engine start and stop determination unit 73 may generate an immediate start request for the internal combustion engine 11, and promptly start the internal combustion engine 11 regardless of an accelerator operation characteristic of the driver. In other words, when the increase speed of the accelerator position is high, the engine start and stop determination unit 73 may consider that an acceleration request is clearly intended by the driver, and generate a command for prompt start of the internal combustion engine 11.

In the example embodiment, the engine start and stop determination unit 73 may be configured to perform idling stop control of automatically stopping operation of the internal combustion engine 11 when the vehicle 1 stops in a situation in which the internal combustion engine 11 is in operation. For example, the engine start and stop determination unit 73 may generate the stop request for the internal combustion engine 11 when a vehicle speed acquired based on the sensor signal from the output rotation speed sensor 53 becomes zero, in a situation in which a shift range of the vehicle 1 is a drive (D) range and the internal combustion engine 11 is in operation.

[3-3. Learning Unit]

The learning unit 75 executes a learning process of learning the accelerator operation characteristic of the driver exhibited when the vehicle 1 starts or accelerates. By executing the learning process, the learning unit 75 may determine whether the driver has a characteristic indicating an operation in which the amount of depression gradually increases at the start of the depression operation on the accelerator pedal, and suddenly decreases after the maximum value becomes large, and thereafter the change in the amount of depression is small. This characteristic is the above-described "third characteristic".

In the example embodiment, the learning unit 75 may determine a proportion, with respect to the number of times the accelerator position when the vehicle 1 starts or accelerates becomes equal to or greater than the predetermined position threshold, of the number of times the accelerator position becomes less than the predetermined position threshold within a predetermined time threshold after becoming equal to or greater than the predetermined position threshold. When the determined proportion is equal to or greater than a predetermined proportion threshold, the learning unit 75 may determine that the accelerator operation characteristic of the driver corresponds to the third characteristic.

Figure 3:
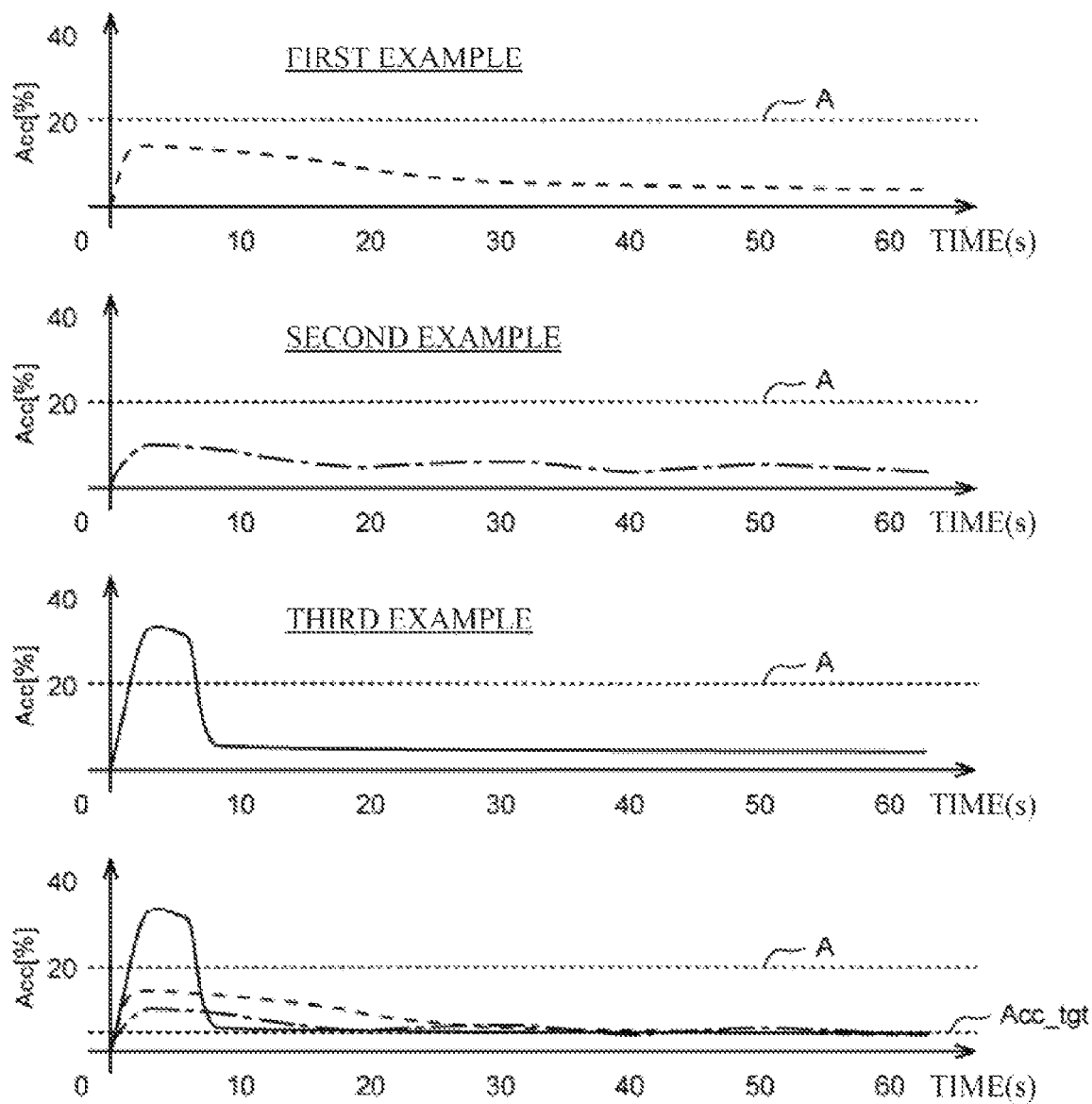
FIG. 3 is an explanatory diagram illustrating examples of an accelerator operation characteristic.

Examples of the accelerator operation characteristic will now be described in detail. FIG. 3 illustrates transition of the accelerator position when the vehicle starts, assuming cases where the accelerator operation characteristic is a first example (i.e., the first characteristic), a second example (i.e., the second characteristic), and a third example (i.e., the third characteristic) described above. Illustrated at the bottom of FIG. 3 are examples in which, assuming that a predetermined position threshold A at which the internal combustion engine 11 is to be started is 20%, drivers having the respective accelerator operation characteristics cause the vehicle 1 to start and keep the accelerator position at 5% assumed as a target position Acc_tgt.

When the accelerator operation characteristic is the first example, the accelerator position at the start of the depression operation on the accelerator pedal is large, but the maximum value of the accelerator position is suppressed to a predetermined degree, and thereafter a change in the accelerator position is small.

When the accelerator operation characteristic is the second example, after the start of the depression operation on the accelerator pedal, the accelerator position is relatively small throughout the depression operation, but the change in the accelerator position fluctuates greatly.

When the accelerator operation characteristic is the third example, the accelerator position at the start of the depression operation on the accelerator pedal gradually increases, and the accelerator position suddenly decreases after the maximum value becomes a relatively large value, and thereafter the change in the accelerator position is small.

The predetermined position threshold A at which the internal combustion engine 11 is to be started and the target position Acc_tgt are superimposed on each accelerator operation characteristic. It is thus found that the accelerator position is kept less than the predetermined position threshold A when the accelerator operation characteristic is the first example and the second example, whereas the accelerator position is equal to or greater than the predetermined position threshold A when the accelerator operation characteristic is the third example. Accordingly, if the internal combustion engine 11 is started without exception when the accelerator position exceeds the predetermined position threshold A, the internal combustion engine 11 may be started, even though the original target position Acc_tgt is less than the predetermined position threshold A, when the accelerator operation characteristic is the third example.

[3-4. Requested Driving Torque Calculation Unit]

The requested driving torque calculation unit 77 may execute a process of calculating the requested driving torque for the vehicle 1. The requested driving torque may be calculated by known various methods. For example, the requested driving torque may be calculated by referring to a driving torque setting map, based on the accelerator position and a speed of the internal combustion engine 11 acquired based on the sensor signal from the engine speed sensor 51.

In addition, the requested driving torque calculation unit 77 may distribute the calculated requested driving torque into target driving torque of the internal combustion engine 11 and target driving torque of the drive motor 13. In one example, the requested driving torque calculation unit 77 may set the requested driving torque as the target driving torque of the drive motor 13, when a flag indicating completion of a process of starting the internal combustion engine 11 has not been set by the internal combustion engine control unit 79. This flag is also referred to as a start completion flag.

When the start completion flag regarding the internal combustion engine 11 has been set by the internal combustion engine control unit 79, the requested driving torque calculation unit 77 may distribute the requested driving torque into the target driving torque of the internal combustion engine 11 and the target driving torque of the drive motor 13. In this case, for example, to preferentially perform electric-powered traveling, the requested driving torque calculation unit 77 may set the requested driving torque as the target driving torque of the drive motor 13 when the requested driving torque is equal to or less than rated torque outputtable by the drive motor 13. When the requested driving torque is greater than the rated torque outputtable by the drive motor 13, the requested driving torque calculation unit 77 may set the rated torque of the drive motor 13 as the target driving torque of the drive motor 13, and set, as the target driving torque of the internal combustion engine 11, a value of remaining torque obtained by subtracting the rated torque of the drive motor 13 from the requested driving torque.

[3-5. Internal Combustion Engine Control Unit]

The internal combustion engine control unit 79 may execute an internal combustion engine start control process of starting the internal combustion engine 11, and an internal combustion engine operation control process of controlling operation of the internal combustion engine 11. In one example, the internal combustion engine control unit 79 may control the operation of the internal combustion engine 11 by controlling driving of, for example, a motor that cranks the internal combustion engine 11 and a fuel injection system of the internal combustion engine 11.

[Internal Combustion Engine Start Control Process]

The internal combustion engine control unit 79 executes the process of starting the internal combustion engine 11 when the start request for the internal combustion engine 11 is generated by the engine start and stop determination unit 73. In the example embodiment, the internal combustion engine control unit 79 executes, based on a result of learning the accelerator operation characteristic of the driver by the learning unit 75, a first start process of starting the internal combustion engine 11 when the accelerator position becomes equal to or greater than the predetermined position threshold, and a second start process of starting the internal combustion engine 11 after a state in which the accelerator position is equal to or greater than the predetermined position threshold continues for a predetermined time period.

In other words, when the accelerator operation characteristic of the driver is an operation characteristic other than the above-described third characteristic, the internal combustion engine control unit 79 may perform the first start process, i.e., promptly start the internal combustion engine 11 when the start request for the internal combustion engine 11 is generated by the engine start and stop determination unit 73. When the accelerator operation characteristic of the driver is the above-described third characteristic, the internal combustion engine control unit 79 may perform the second start process, i.e., start the internal combustion engine 11 after the state in which the accelerator position is equal to or greater than the predetermined position threshold continues for the predetermined time period, after the start request for the internal combustion engine 11 is generated by the engine start and stop determination unit 73.

For example, in the example embodiment, the internal combustion engine control unit 79 may be configured to start the internal combustion engine 11 after the state in which the accelerator position is equal to or greater than the predetermined position threshold continues for the predetermined time period, after the start request for the internal combustion engine 11 is generated by the engine start and stop determination unit 73. Moreover, the internal combustion engine control unit 79 may be configured to, even if the accelerator position once becomes less than the predetermined position threshold after becoming equal to or greater than the predetermined position threshold, start the internal combustion engine 11 when the accelerator position thereafter becomes equal to or greater than the predetermined position threshold again in a very short time.

In one example, the internal combustion engine control unit 79 may be configured to set a start suppression mode when the start request for the internal combustion engine 11 is generated by the engine start and stop determination unit 73.

The internal combustion engine control unit 79 may be configured to cancel the set start suppression mode upon establishment of any one of the following:

a condition that a predetermined first time period elapses without the accelerator position becoming less than the predetermined position threshold after the start request for the internal combustion engine 11 is generated;

a condition that the accelerator position becomes less than the predetermined position threshold again before elapse of the predetermined first time period after the start request for the internal combustion engine 11 is generated, and thereafter a predetermined second time period elapses without the accelerator position becoming equal to or greater than the predetermined position threshold again; and a condition that the accelerator position becomes less than the predetermined position threshold again before elapse of the predetermined first time period after the start request for the internal combustion engine 11 is generated, and thereafter the accelerator position becomes equal to or greater than the predetermined position threshold again before elapse of the predetermined second time period.

The internal combustion engine control unit 79 may be configured to start the internal combustion engine 11 when the set start suppression mode is canceled in a state in which the accelerator position is equal to or greater than the predetermined position threshold. Thus, even for a driver having the above-described third characteristic, the internal combustion engine 11 is appropriately started when the driver has the torque rapid increase intention, making it possible to achieve the requested driving torque intended by the driver.

In the example embodiment, when the start request for the internal combustion engine 11 is generated by the engine start and stop determination unit 73, the internal combustion engine control unit 79 may set a start suppression mode flag.

The start suppression mode flag may be cleared when a counter value of a first timer counter reaches the predetermined first time period and the first timer counter is reset. The first timer counter may count elapsed time from a time when the start request for the internal combustion engine 11 is generated.

The start suppression mode flag may be cleared also when a counter value of a second timer counter reaches the predetermined second time period and the second timer counter is reset. The second timer counter may count a duration in a state in which the accelerator position is kept less than the predetermined position threshold, from a time when the accelerator position becomes less than the predetermined position threshold again before the counter value of the first timer counter reaches the predetermined first time period.

The start suppression mode flag may be cleared also when, after the accelerator position becomes less than the predetermined position threshold again before the counter value of the first timer counter reaches the predetermined first time period, the accelerator position becomes equal to or greater than the predetermined position threshold again before the counter value of the second timer counter reaches the predetermined second time period.

Accordingly, the internal combustion engine control unit 79 may start the internal combustion engine 11 when the start suppression mode flag is cleared in a state in which the accelerator position is equal to or greater than the predetermined position threshold.

In addition, in the example embodiment, the internal combustion engine control unit 79 may be configured to promptly start the internal combustion engine 11 regardless of the accelerator operation characteristic of the driver, when the immediate start request for the internal combustion engine 11 is generated by the engine start and stop determination unit 73. Thus, even if the driver clearly has the torque rapid increase intention and the requested driving torque suddenly increases, it is possible to output driving torque corresponding to the requested driving torque, with use of the driving torque outputted from the internal combustion engine 11 and the drive motor 13.

When the start of the internal combustion engine 11 is completed, the internal combustion engine control unit 79 may set the start completion flag regarding the internal combustion engine 11. Completion of the start of the internal combustion engine 11 may be determined based on whether a preset condition is established. The preset condition may be, for example, the engine speed becoming equal to or greater than a predetermined threshold, or an amplitude of the engine speed becoming less than a predetermined value.

[Internal Combustion Engine Operation Control Process]

After the start of the internal combustion engine 11 is completed, the internal combustion engine control unit 79 may control the operation of the internal combustion engine 11, based on the target driving torque of the internal combustion engine 11 calculated by the requested driving torque calculation unit 77. The internal combustion engine operation control process may be performed by a known method. For example, the internal combustion engine control unit 79 may set an amount of fuel injection based on the target driving torque, and control factors including fuel injection timing, ignition timing, and opening timings of an intake valve and an exhaust valve, to cause the internal combustion engine 11 to output driving torque corresponding to the target driving torque.

In addition, the internal combustion engine control unit 79 may stop the operation of the internal combustion engine 11, when the stop request for the internal combustion engine 11 is generated by the engine start and stop determination unit 73. In one example, the internal combustion engine control unit 79 may stop the operation of the internal combustion engine 11 by stopping fuel injection to the internal combustion engine 11.

[3-6. Motor Control Unit]

The motor control unit 81 may control electric power to be supplied to the drive motor 13, based on the target driving torque of the drive motor 13 calculated by the requested driving torque calculation unit 77. The process of controlling driving of the drive motor 13 may be performed by a known method. For example, the motor control unit 81 may, based on the target driving torque, control driving of a switching device provided in the inverter 19, and control a voltage and a current of the three-phase alternating-current electric power to be supplied to the drive motor 13, to thereby cause the drive motor 13 to output driving torque corresponding to the target driving torque.

4. Operation Example

Next, detailed description is given of operation of a start control process for the internal combustion engine 11, included in processing operation of the control apparatus 60 that serves as the internal combustion engine start control apparatus according to the example embodiment.

Figure 4:
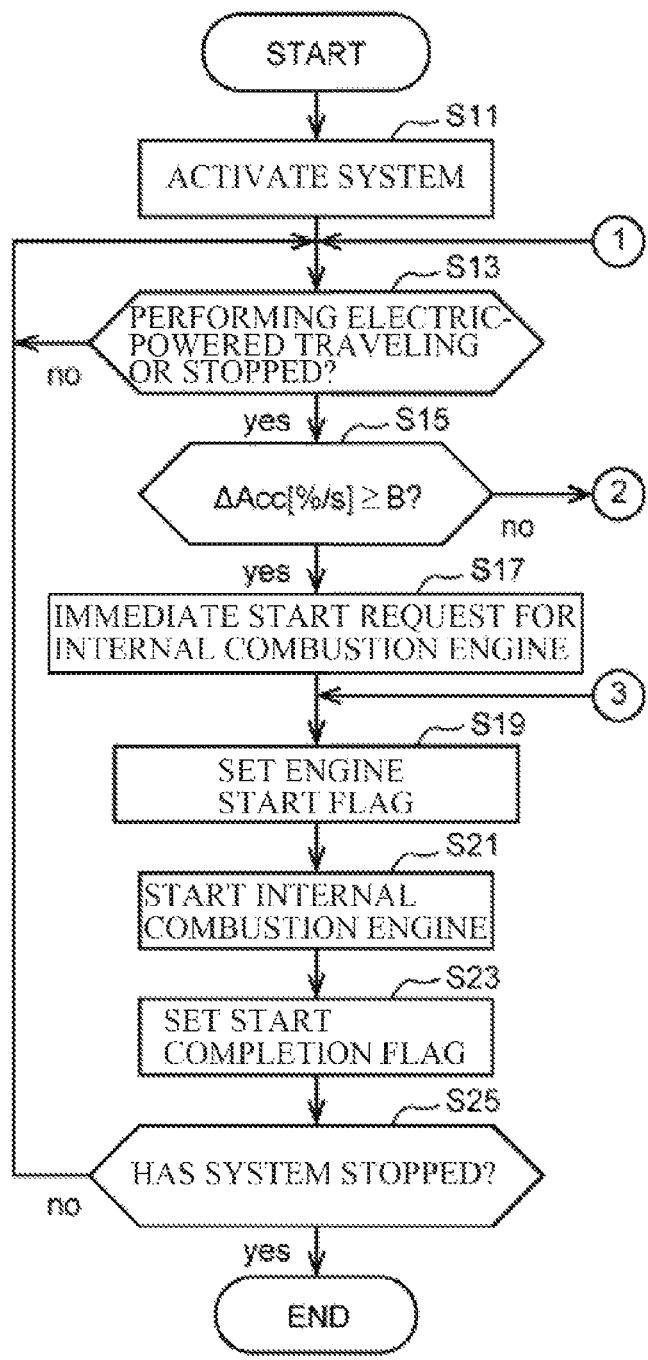
FIG. 4 is a flowchart illustrating an example of operation of an internal combustion engine start control process to be performed by the control apparatus according to one example embodiment.
Figure 5:
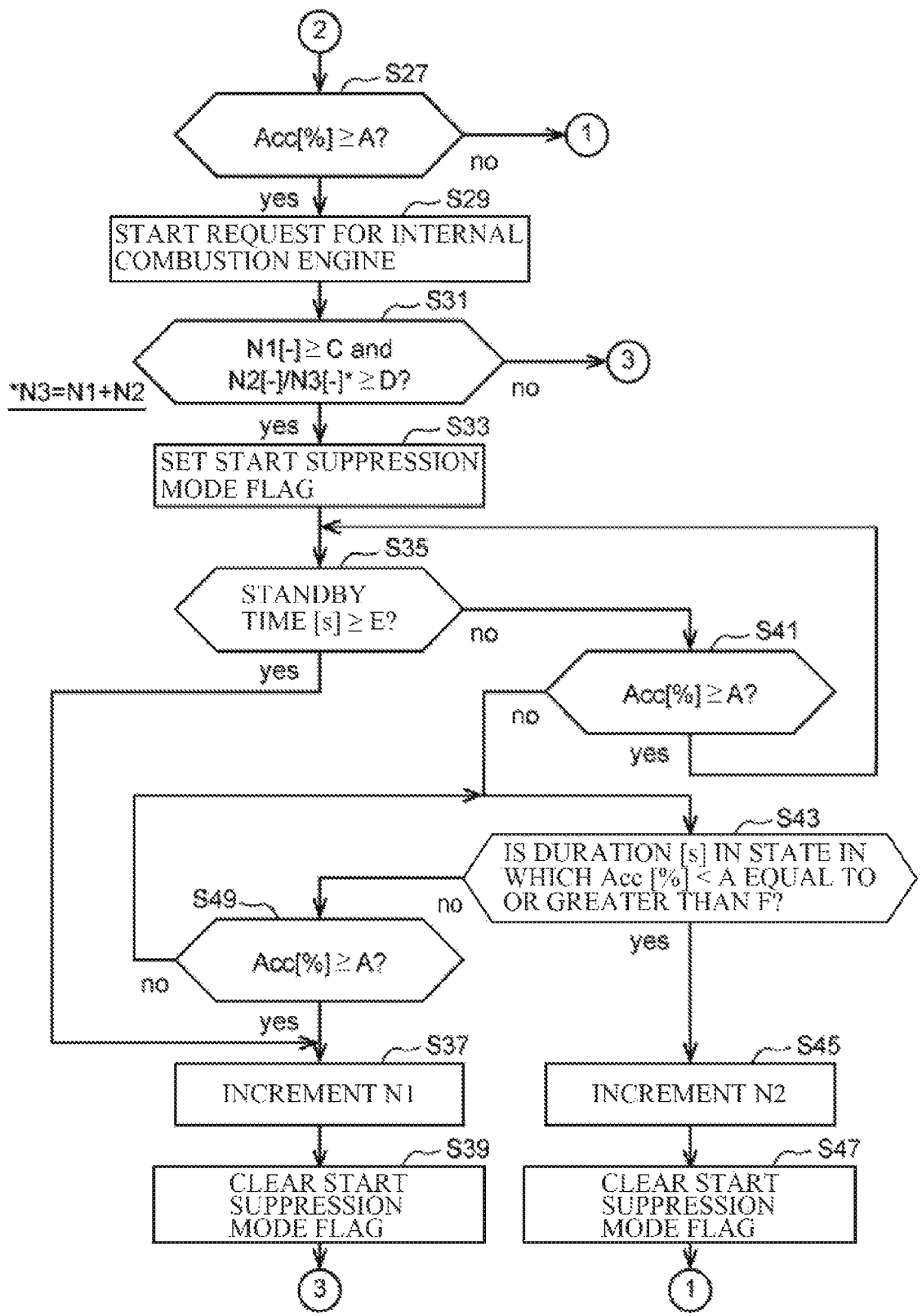
FIG. 5 is a flowchart illustrating the example of the operation of the internal combustion engine start control process to be performed by the control apparatus according to one example embodiment.

FIGS. 4 and 5 are flowcharts illustrating an example of operation of the start control process for the internal combustion engine 11 to be performed by the control apparatus 60.

First, upon activation of a hybrid vehicle system including the control apparatus 60 (step S11), the engine start and stop determination unit 73 of the processor 61 may determine whether the vehicle 1 is performing electric-powered traveling or stopped (step S13). If the determination result in step S13 is "no", i.e., the internal combustion engine 11 is in an operating state and the vehicle 1 is traveling (S13: No), the engine start and stop determination unit 73 may repeatedly execute the determination in step S13.

If the vehicle 1 is performing electric-powered traveling or stopped (S13: Yes), the engine start and stop determination unit 73 may determine whether a change speed ΔAcc (%/second) of an accelerator position Acc is equal to or greater than a predetermined threshold B (step S15). Step S15 may be a process of determining a sudden depression operation on the accelerator pedal performed by the driver. The threshold B may be set to any value in advance.

If the change speed ΔAcc of the accelerator position is equal to or greater than the predetermined threshold B (S15: Yes), the engine start and stop determination unit 73 may generate the immediate start request for the internal combustion engine 11 (step S17), because it seems that the driver desires rapid acceleration. In this case, the internal combustion engine control unit 79 of the processor 61 may set an engine start flag (step S19), and promptly start the internal combustion engine 11 regardless of the accelerator operation characteristic of the driver (step S21).

If the change speed ΔAcc of the accelerator position is less than the predetermined threshold B (S15: No), the engine start and stop determination unit 73 may determine whether the accelerator position Acc is equal to or greater than the predetermined position threshold A (step S27). If the accelerator position Acc is less than the predetermined position threshold A (S27: No), it is unnecessary to start the internal combustion engine 11, because it is possible to output the requested driving torque with use of the driving torque outputted from the drive motor 13. Accordingly, the engine start and stop determination unit 73 may cause the flow to return to step S13, and repeatedly execute the processes of the steps described above.

If the accelerator position Acc is equal to or greater than the predetermined position threshold A (S27: Yes), the engine start and stop determination unit 73 may generate the start request for the internal combustion engine 11 (step S29). Thereafter, the learning unit 75 may determine whether N1≥C is satisfied and (N2/N3)≥D is satisfied (step S31). "N1≥C" indicates that a number of times (N1) the internal combustion engine 11 is started based on the accelerator position Acc is equal to or greater than a predetermined threshold C. "(N2/N3)≥D" indicates that the proportion (%) of a number of times N2 with respect to a number of times N3 is equal to or greater than a predetermined threshold D. The number of times N2 indicates the number of times the accelerator position Acc becomes equal to or greater than the predetermined position threshold A, but the accelerator position Acc returns to less than the predetermined position threshold A within the predetermined first time period, and the internal combustion engine 11 is not started. The number of times N3 indicates the number of times the accelerator position Acc becomes equal to or greater than the predetermined position threshold A and the start request is generated. In one embodiment, the first time period may serve as the "predetermined time threshold". In one embodiment, the threshold D may serve as the "predetermined proportion threshold".

The number of times (N1) the internal combustion engine 11 is started based on the accelerator position Acc may be the number of times the internal combustion engine 11 is actually started as a result of the accelerator position Acc becoming equal to or greater than the predetermined position threshold A while the internal combustion engine 11 is stopped. This number of times N1 may thus not include the number of times determination is made in above-described step S15 that the change speed ΔAcc of the accelerator position Acc is equal to or greater than the predetermined threshold B and the internal combustion engine 11 is started. The number of times (N1) the internal combustion engine 11 is started based on the accelerator position Acc may correspond to the sum of: the number of times, after the accelerator position Acc becomes equal to or greater than the predetermined position threshold A, the predetermined first time period elapses without the accelerator position Acc becoming less than the predetermined position threshold A and the internal combustion engine 11 is started; and the number of times the accelerator position Acc returns to less than the predetermined position threshold A within the predetermined first time period, but thereafter becomes equal to or greater than the predetermined position threshold A again before elapse of the predetermined second time period and the internal combustion engine 11 is started.

The predetermined threshold C may be used to determine whether the number of samples obtained is enough to ensure accuracy in determining whether the accelerator operation characteristic of the driver is the third characteristic. The threshold C may be set to any value in advance.

The number of times N3 the accelerator position Acc becomes equal to or greater than the predetermined position threshold A and the start request is generated may correspond to the sum of the number of times N1 and the number of times N2 (i.e., N3=N1+N2). The number of times N1 indicates the number of times the accelerator position Acc becomes equal to or greater than the predetermined position threshold A and the internal combustion engine 11 is actually started. The number of times N2 indicates the number of times the accelerator position Acc becomes equal to or greater than the predetermined position threshold A, but the accelerator position Acc returns to less than the predetermined position threshold A within the predetermined first time period, and the internal combustion engine 11 is not started. In other words, the number of times (N3) may be an index value indicating the third characteristic in which the accelerator position Acc once becomes equal to or greater than the predetermined position threshold A, but the accelerator position Acc decreases to less than the predetermined position threshold A in a short time and is kept in that state. Accordingly, in step S31, it may be determined whether the accelerator operation characteristic of the driver exhibits a strong tendency of the third characteristic, in a situation in which a large number of samples are obtained in which the internal combustion engine 11 has been started based on the accelerator position Acc.

If the determination result in step S31 is "no" (S31: No), the internal combustion engine control unit 79 may set the engine start flag (step S19), and promptly start the internal combustion engine 11 (step S21), because it seems that the accelerator operation characteristic of the driver is an operation characteristic other than the third characteristic. The process in which the internal combustion engine 11 is started through steps S27, S29, S31, S19, and S21 may serve as the first start process.

If the determination result in step S31 is "yes" (S31: Yes), it seems that the accelerator operation characteristic of the driver is the third characteristic. In this case, the internal combustion engine control unit 79 may set the start suppression mode flag (step S33). Thus, a mode may be set in which the internal combustion engine 11 is not started immediately, even if the accelerator position Acc becomes equal to or greater than the predetermined position threshold A as a result of an operation on the accelerator pedal performed by the driver having the third characteristic.

Thereafter, the internal combustion engine control unit 79 may determine whether elapsed time or standby time from the generation of the start request for the internal combustion engine 11 has reached a predetermined first time period E (step S35). In one example, the internal combustion engine control unit 79 may determine whether standby time T1 measured by the first timer counter has reached the predetermined first time period E. The first time period E may be a time period to be used to determine that the driver has depressed the accelerator position Acc with the torque rapid increase intention even for the driver having the third characteristic. The first time period E may be set to any value in advance. If the first time period E is too short, the internal combustion engine 11 can be frequently started in a situation in which the internal combustion engine 11 originally does not have to be started. On the other hand, if the first time period E is too long, the start of the internal combustion engine 11 can be delayed even though the driver has the torque rapid increase intention, which can result in a decrease in a sense of reliability of the driver. In view of this tendency, the first time period E may be set to, for example, a value within a range of 5 to 15 seconds.

If the standby time T1 has reached the predetermined first time period E (S35: Yes), it seems that the driver has the torque rapid increase intention. In this case, the learning unit 75 of the processor 61 may increment, or add 1 (one) to, a counter value N1 of a counter that measures the number of times the internal combustion engine 11 is started based on the accelerator position Acc (step S37). Thereafter, the internal combustion engine control unit 79 may clear the start suppression mode flag (step S39), and thereafter set the engine start flag (step S19), and start the internal combustion engine 11 (step S21).

If the standby time T1 has not reached the predetermined first time period E (S35: No), the internal combustion engine control unit 79 may determine whether the accelerator position Acc is still equal to or greater than the predetermined position threshold A (step S41). If the accelerator position Acc is still kept equal to or greater than the predetermined position threshold A (S41: Yes), the internal combustion engine control unit 79 may cause the flow to return to step S35, and repeat the process of determining whether the elapsed time or standby time from the generation of the start request for the internal combustion engine 11 has reached the predetermined first time period E (step S35).

If the accelerator position Acc has decreased to less than the predetermined position threshold A (S41: No), the internal combustion engine control unit 79 may determine whether elapsed time or duration from the decrease of the accelerator position Acc to less than the predetermined position threshold A has reached a predetermined second time period F (step S43). In one example, the internal combustion engine control unit 79 may determine whether a duration T2 measured by the second timer counter that counts elapsed time from the time when the accelerator position Acc decreases to less than the predetermined position threshold A has reached the predetermined second time period F.

The second time period F may be a time period to be used to determine that the driver having the third characteristic has depressed the accelerator position Acc with the torque rapid increase intention, but the accelerator position Acc has once decreased to less than the predetermined position threshold A for some sort of reason. The second time period F may be set to any value in advance. If the second time period F is too short, it becomes more likely for the duration T2 measured by the second timer counter to be reset, and the start of the internal combustion engine 11 can be delayed even though the driver has the torque rapid increase intention. On the other hand, if the second time period F is too long, the internal combustion engine 11 can be frequently started even though the driver does not have the torque rapid increase intention. In view of this tendency, the second time period F may be set to, for example, a value within a range of 5 to 15 seconds.

If the duration T2 has reached the predetermined second time period F (S43: Yes), it seems that the accelerator position Acc has becomes equal to or greater than the predetermined position threshold A due to the accelerator operation characteristic even though the driver does not have the torque rapid increase intention. In this case, the learning unit 75 may increment, or add 1 (one) to, the counter value (N2) of a counter that measures the number of times the accelerator position Acc becomes equal to or greater than the predetermined position threshold A, but the accelerator position Acc returns to less than the predetermined position threshold A within the predetermined first time period E, and the internal combustion engine 11 is not started (step S45). Thereafter, the internal combustion engine control unit 79 may clear the start suppression mode flag (step S47). In this case, the processor 61 may cause the flow to return to step S13, and repeatedly execute the processes of the steps described above.

If the duration T2 has not reached the predetermined second time period F (S41: No), the internal combustion engine control unit 79 may determine whether the accelerator position Acc has become equal to or greater than the predetermined position threshold A again (step S49). If the accelerator position Acc is still kept less than the predetermined position threshold A (S49: No), the internal combustion engine control unit 79 may cause the flow to return to step S43, and repeatedly execute the determination of whether the duration T2 measured by the second timer counter has reached the predetermined second time period F (step S43).

If the accelerator position Acc has become equal to or greater than the predetermined position threshold A again (S49: Yes), it seems that the accelerator position Acc has once become less than the predetermined position threshold A for some sort of reason, but the driver has the torque rapid increase intention. In this case, the learning unit 75 may increment, or add 1 (one) to, the counter value N1 of the counter that measures the number of times the internal combustion engine 11 is started based on the accelerator position Acc (step S37). Thereafter, the internal combustion engine control unit 79 may clear the start suppression mode flag (step S39), and thereafter set the engine start flag (step S19), and start the internal combustion engine 11 (step S21).

The process in which the internal combustion engine 11 is started or the start of the internal combustion engine 11 is suppressed through steps S27, S29, S31, and S33 to S49 may serve as the second start process. The process in which, while steps S27 to S49 are executed, the predetermined numbers of times (N1 to N3) are measured or calculated may serve as the process of learning the accelerator operation characteristic of the driver.

After the internal combustion engine 11 is started by the first start process and the second start process, i.e., after the internal combustion engine 11 is started in step S21, the internal combustion engine control unit 79 may set the start completion flag (step S23) when the start of the internal combustion engine 11 is completed. Thus, the internal combustion engine control unit 79 may move on to the internal combustion engine operation control process.

Thereafter, the internal combustion engine control unit 79 may determine whether the hybrid vehicle system has stopped (step S25). If the hybrid vehicle system has not stopped (S25: No), the processor 61 may cause the flow to return to step S13, and repeatedly execute the processes of the steps described above. If the hybrid vehicle system has stopped (S25: Yes), the processor 61 may end the start control process for the internal combustion engine 11.

In the above-described manner, while learning the accelerator operation characteristic of the driver, the control apparatus 60 according to the example embodiment determines, depending on whether the accelerator operation characteristic of the driver corresponds to the third characteristic, whether to promptly start the internal combustion engine 11 or put the internal combustion engine 11 on standby for the start, when the accelerator position Acc becomes equal to or greater than the predetermined position threshold A. Thus, when a driver having the third characteristic depresses the accelerator pedal, it is possible to suppress the start of the internal combustion engine 11 unintended by the driver. In addition, when the driver having the third characteristic depresses the accelerator pedal with the torque rapid increase intention, the internal combustion engine 11 is appropriately started. When a driver having a characteristic other than the third characteristic greatly depresses the accelerator pedal, the internal combustion engine is appropriately started, making it possible to meet an acceleration request intended by the driver.

5. Application Example

Next, description is given of workings of the start control process for the internal combustion engine 11 to which any embodiment of the disclosure is applied.

Figure 6:
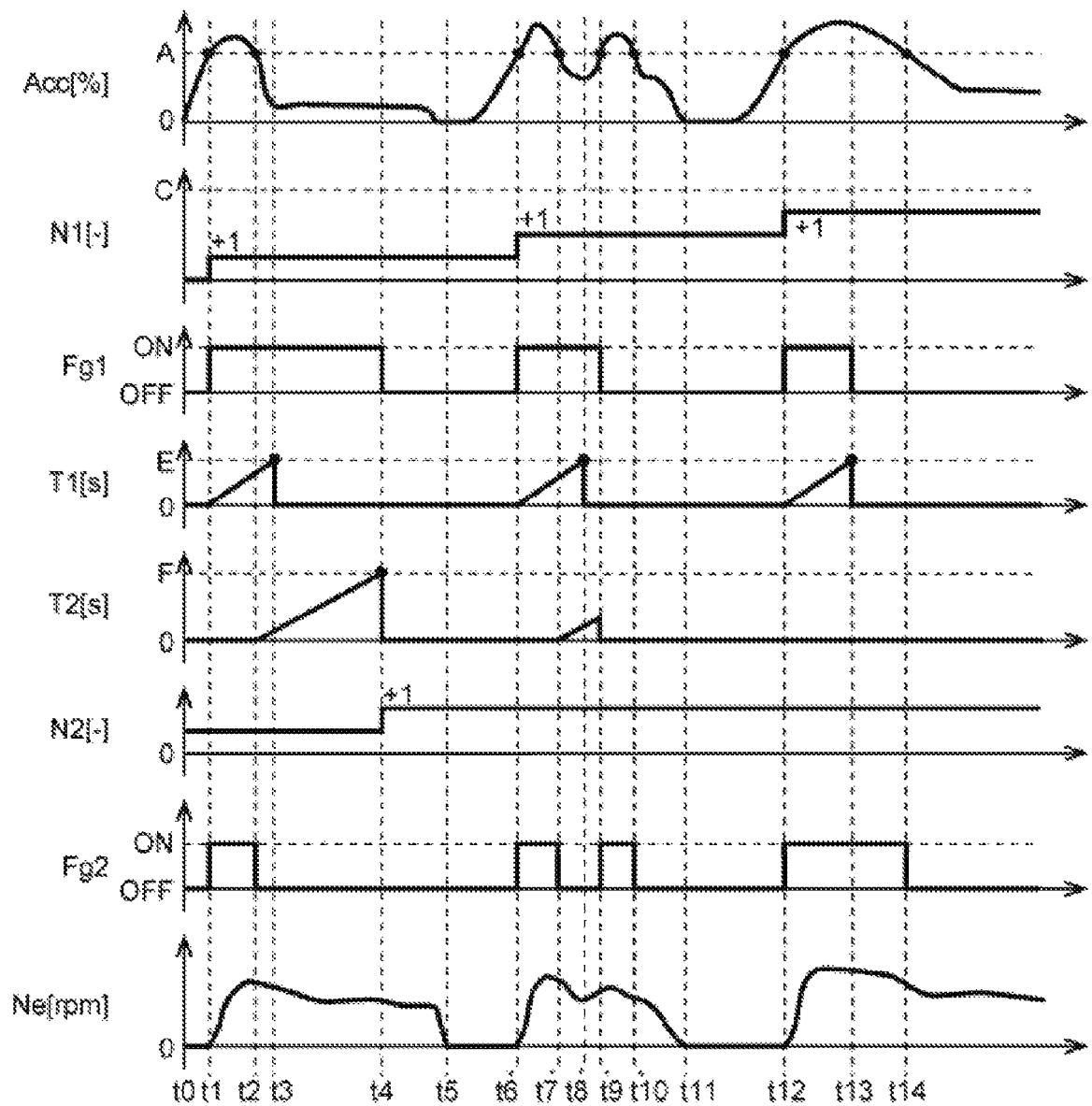
FIG. 6 is an explanatory diagram illustrating a reference example for description of workings of the control apparatus according to one example embodiment.
Figure 7:
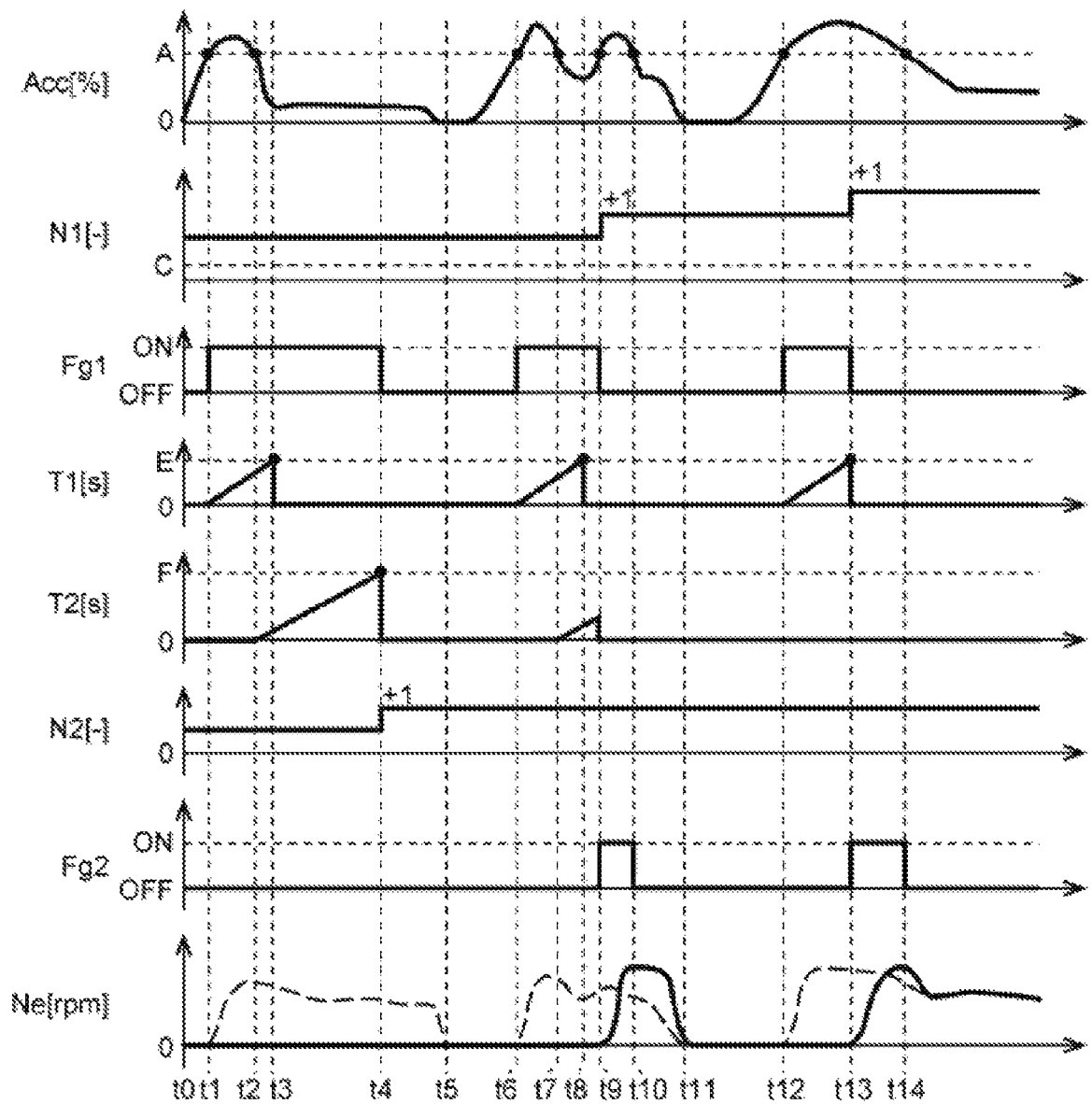
FIG. 7 is an explanatory diagram illustrating the workings of the control apparatus according to one example embodiment.

FIGS. 6 and 7 both illustrate the start control process for the internal combustion engine 11 based on a depression operation on the accelerator pedal performed by the driver whose accelerator operation characteristic is the third characteristic. FIG. 6 is an explanatory diagram illustrating the start control process for the internal combustion engine 11 in a state in which no determination has been made by the learning process that the accelerator operation characteristic of the driver is the third characteristic. In other words, FIG. 6 illustrates an example in which the internal combustion engine 11 is started when the accelerator position Acc becomes equal to or greater than the predetermined position threshold A. FIG. 7 is an explanatory diagram illustrating the start control process for the internal combustion engine 11 in a state in which a determination has been made by the learning process that the accelerator operation characteristic of the driver is the third characteristic.

FIGS. 6 and 7 each illustrate the counter value N1, an on or off state of a start suppression mode flag Fg1, the standby time T1 (sec) measured by the first timer counter, the duration T2 (sec) measured by the second timer counter, the counter value N2, an on or off state of an engine start flag Fg2, and an engine speed Ne (rpm). The counter value N1 indicates the counter value of the counter that measures the number of times the internal combustion engine 11 is started based on the accelerator position Acc. The counter value N2 indicates the counter value of the counter that measures the number of times the accelerator position Acc decreases to less than the predetermined position threshold A before the standby time T1 from when the accelerator position Acc becomes equal to or greater than the predetermined position threshold A reaches the predetermined first time period E, and the internal combustion engine 11 is not started.

The accelerator position Acc may be acquired based on the sensor signal from the accelerator sensor 55, and may fluctuate depending on the amount of depression of the accelerator pedal by the driver. The engine speed Ne may be acquired based on the sensor signal from the engine speed sensor 51, and may fluctuate depending on a state of operation of the internal combustion engine 11.

The counter value N1 of the counter that measures the number of times the internal combustion engine 11 is started based on the accelerator position Acc may be incremented, when the internal combustion engine 11 is started as a result of the accelerator position Acc becoming equal to or greater than the predetermined position threshold A while the internal combustion engine 11 is stopped (step S37 in FIG. 5). The counter value N1 may be incremented upon condition establishment, without being returned to zero.

The start suppression mode flag Fg1 may be set, or turned on, when the accelerator position Acc becomes equal to or greater than the predetermined position threshold A while the internal combustion engine 11 is stopped. The start suppression mode flag Fg1 may be cleared, or turned off, either when the standby time T1 measured by the first timer counter is reset or when the duration T2 measured by the second timer counter is reset.

The standby time T1 (sec) measured by the first timer counter may start to be measured when the start suppression mode flag Fg1 is set, and may be returned to zero when the standby time T1 reaches the predetermined first time period E.

The duration T2 (sec) measured by the second timer counter may start to be measured when the accelerator position Acc becomes less than the predetermined position threshold A in a state in which the start suppression mode flag Fg1 is set, and may be returned to zero when the accelerator position Acc becomes equal to or greater than the predetermined position threshold A and when the duration T2 reaches the predetermined second time period F.

The counter value N2 of the counter that measures the number of times the accelerator position Acc decreases to less than the predetermined position threshold A before the standby time T1 from when the accelerator position Acc becomes equal to or greater than the predetermined position threshold A reaches the predetermined first time period E, and the internal combustion engine 11 is not started may be incremented, i.e., 1 (one) may be added to the counter value N2, when the duration T2 measured by the second timer counter reaches the predetermined second time period F (step S45 in FIG. 5). The counter value N2 may be incremented upon condition establishment, without being returned to zero.

If no determination has been made by the learning process that the accelerator operation characteristic of the driver is the third characteristic, the engine start flag Fg2 may be set, or turned on, when the accelerator position Acc becomes equal to or greater than the predetermined position threshold A, and cleared, or turned off, when the accelerator position Acc decreases to less than the predetermined position threshold A. If a determination has been made by the learning process that the accelerator operation characteristic of the driver is the third characteristic, the engine start flag Fg2 may be set, or turned on, when the accelerator position Acc becomes equal to or greater than the predetermined position threshold A and the start suppression mode flag Fg1 is switched from on to off, and cleared, or turned off, when the accelerator position Acc decreases to less than the predetermined position threshold A.

Note that the on or off state of the start suppression mode flag Fg1, the standby time T1, the duration T2, and the counter value N2 may each exhibit a common behavior regardless of whether it has been determined that the accelerator operation characteristic of the driver is the third characteristic.

In the examples illustrated in FIGS. 6 and 7, depression of the accelerator pedal is started at time to, and when the accelerator position Acc reaches the predetermined position threshold A at time t1, the start suppression mode flag Fg1 may be set, and measurement of the standby time T1 by the first timer counter may be started. In the example of FIG. 6 in which no determination has been made by the learning process that the accelerator operation characteristic of the driver is the third characteristic, i.e., the counter value N1 has not reached the threshold C, the engine start flag Fg2 may be set at time t1, and the internal combustion engine 11 may be started, i.e., the engine speed Ne may increase. Accordingly, the counter value N1 of the counter that measures the number of times the internal combustion engine 11 is started based on the accelerator position Acc may be incremented. In contrast, in the example of FIG. 7 in which a determination has been made by the learning process that the accelerator operation characteristic of the driver is the third characteristic, i.e., the counter value N1 has reached the threshold C, the internal combustion engine 11 may not be started, because the condition for setting of the engine start flag Fg2 is not established at time t1.

Thereafter, when the accelerator position Acc becomes less than the predetermined position threshold A at time t2, measurement of the duration T2 by the second timer counter may be started. In the example of FIG. 6 in which no determination has been made by the learning process that the accelerator operation characteristic of the driver is the third characteristic, i.e., the counter value N1 has not reached the threshold C, the engine start flag Fg2 in the on state may be cleared. However, the operation of the internal combustion engine 11 may be continued, because the accelerator position Acc has not become zero.

Thereafter, when the standby time T1 reaches the first time period E in the state in which the accelerator position Acc is less than the predetermined position threshold A at time t3, the standby time T1 may be returned to zero. Further, when the duration T2 reaches the second time period F in the state in which the accelerator position Acc is less than the predetermined position threshold A at time t4, the start suppression mode flag Fg1 may be cleared, and the counter value N2 may be incremented. Thereafter, when the accelerator position Acc becomes zero at time t5, the operation of the internal combustion engine 11 may be stopped in the example of FIG. 6.

Thereafter, when the accelerator position Acc reaches the predetermined position threshold A at time t6, the start suppression mode flag Fg1 may be set, and measurement of the standby time T1 by the first timer counter may be started, as with at time t1. In the example of FIG. 6 in which no determination has been made by the learning process that the accelerator operation characteristic of the driver is the third characteristic, i.e., the counter value N1 has not reached the threshold C, the engine start flag Fg2 may be set at time t6, and the internal combustion engine 11 may be started, i.e., the engine speed Ne may increase. Accordingly, the counter value N1 of the counter that measures the number of times the internal combustion engine 11 is started based on the accelerator position Acc may be incremented. In contrast, in the example of FIG. 7 in which a determination has been made by the learning process that the accelerator operation characteristic of the driver is the third characteristic, i.e., the counter value N1 has reached the threshold C, the internal combustion engine 11 may not be started, because the condition for setting of the engine start flag Fg2 is not established at time t6.

Thereafter, when the accelerator position Acc becomes less than the predetermined position threshold A at time t7, measurement of the duration T2 by the second timer counter may be started, as with at time t2. In the example of FIG. 6 in which no determination has been made by the learning process that the accelerator operation characteristic of the driver is the third characteristic, i.e., the counter value N1 has not reached the threshold C, the engine start flag Fg2 in the on state may be cleared. However, the operation of the internal combustion engine 11 may be continued, because the accelerator position Acc has not become zero.

Thereafter, when the standby time T1 reaches the first time period E in the state in which the accelerator position Acc is less than the predetermined position threshold A at time t8, the standby time T1 may be returned to zero, as with at time t3.

Thereafter, when the accelerator position Acc reaches the predetermined position threshold A again before the duration T2 reaches the second time period F at time t9, the duration T2 may be returned to zero, the start suppression mode flag Fg1 may be cleared, and the engine start flag Fg2 may be set. In the example of FIG. 6 in which no determination has been made by the learning process that the accelerator operation characteristic of the driver is the third characteristic, i.e., the counter value N1 has not reached the threshold C, the operation of the internal combustion engine 11 may be continued, because the internal combustion engine 11 is already in the operating state. In contrast, in the example of FIG. 7 in which a determination has been made by the learning process that the accelerator operation characteristic of the driver is the third characteristic, i.e., the counter value N1 has reached the threshold C, the internal combustion engine 11 may be started, i.e., the engine speed Ne may increase. Accordingly, the counter value N1 of the counter that measures the number of times the internal combustion engine 11 is started based on the accelerator position Acc may be incremented.

Thereafter, when the accelerator position Acc decreases to less than the predetermined position threshold A again at time t10, the engine start flag Fg2 may be cleared. However, the operation of the internal combustion engine 11 may be continued in both of the examples in FIGS. 6 and 7, because the accelerator position Acc has not become zero. Thereafter, when the accelerator position Acc becomes zero at time t11, the operation of the internal combustion engine 11 may be stopped in both of the examples in FIGS. 6 and 7.

Thereafter, when the accelerator position Acc reaches the predetermined position threshold A at time t12, the start suppression mode flag Fg1 may be set, and measurement of the standby time T1 by the first timer counter may be started, as with at time t1. In the example of FIG. 6 in which no determination has been made by the learning process that the accelerator operation characteristic of the driver is the third characteristic, i.e., the counter value N1 has not reached the threshold C, the engine start flag Fg2 may be set at time t12, and the internal combustion engine 11 may be started, i.e., the engine speed Ne may increase. Accordingly, the counter value N1 of the counter that measures the number of times the internal combustion engine 11 is started based on the accelerator position Acc may be incremented. In contrast, in the example of FIG. 7 in which a determination has been made by the learning process that the accelerator operation characteristic of the driver is the third characteristic, i.e., the counter value N1 has reached the threshold C, the internal combustion engine 11 may not be started, because the condition for setting of the engine start flag Fg2 is not established at time t12.

Thereafter, when the standby time T1 reaches the first time period E in the state in which the accelerator position Acc is equal to or greater than the predetermined position threshold A at time t13, the standby time T1 may be returned to zero, and the start suppression mode flag Fg1 may be cleared. In the example of FIG. 6 in which no determination has been made by the learning process that the accelerator operation characteristic of the driver is the third characteristic, i.e., the counter value N1 has not reached the threshold C, the operation of the internal combustion engine 11 may be continued, because the internal combustion engine 11 is already in the operating state. The engine start flag Fg2 may be kept in the on state. In contrast, in the example of FIG. 7 in which a determination has been made by the learning process that the accelerator operation characteristic of the driver is the third characteristic, i.e., the counter value N1 has reached the threshold C, the engine start flag Fg2 may be set, and the internal combustion engine 11 may be started, i.e., the engine speed Ne may increase. Accordingly, the counter value N1 of the counter that measures the number of times the internal combustion engine 11 is started based on the accelerator position Acc may be incremented.

Thereafter, when the accelerator position Acc decreases to less than the predetermined position threshold A again at time t14, the engine start flag Fg2 may be cleared in both of the examples in FIGS. 6 and 7. However, the operation of the internal combustion engine 11 may be continued in both of the examples in FIGS. 6 and 7, because the accelerator position Acc has not become zero.

In FIG. 7, a dashed line indicates the engine speed Ne in the example of FIG. 6 in which no determination has been made that the accelerator operation characteristic of the driver is the third characteristic. The engine speed Ne (indicated by a solid line) in the case where a determination has been made that the accelerator operation characteristic of the driver is the third characteristic is compared with the engine speed Ne (indicated by the dashed line) in the case where no determination has been made that the accelerator operation characteristic of the driver is the third characteristic. It is apparent from the comparison that, according to at least one embodiment of the disclosure, it is possible to reduce the number of times the internal combustion engine 11 is started when a driver having the third characteristic performs an operation of causing the vehicle 1 to start. For example, upon a depression operation on the accelerator pedal from time t1, it is possible to prevent the internal combustion engine 11 from being started when the driver does not have the torque rapid increase intention.

In addition, upon a depression operation on the accelerator pedal from time t6 and from time t12, it is possible to determine that the driver has the torque rapid increase intention, and prevent the internal combustion engine 11 from failing to be started.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the foregoing example embodiments, the control apparatus 60 mounted on the vehicle 1 may perform all of the operations of the control apparatus 60, but the disclosure is not limited to this example. A portion or all of the operations of the control apparatus 60 may be implemented by an external server communicably coupled to the vehicle 1.

The control apparatus 60 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control apparatus 60 illustrated in FIG. 1.

The invention claimed is:

1. An internal combustion engine start control apparatus configured to control start of an internal combustion engine in a vehicle, the vehicle comprising a drive motor and the internal combustion engine as driving force sources, the internal combustion engine start control apparatus comprising:
   one or more processors; and
   one or more memories communicably coupled to the one or more processors, wherein
   the one or more processors are configured to execute
   an engine start and stop determination process of generating a stop request for the internal combustion engine when an accelerator position based on an operation by a driver who drives the vehicle is less than a predetermined position threshold, and generating a start request for the internal combustion engine when the accelerator position becomes equal to or greater than the predetermined position threshold,
   a learning process of learning an accelerator operation characteristic of the driver exhibited when the vehicle starts or accelerates, and
   an internal combustion engine start process of executing, based on a result of learning the accelerator operation characteristic, a first start process of starting the internal combustion engine when the accelerator position becomes equal to or greater than the predetermined position threshold, and a second start process of starting the internal combustion engine after a state in which the accelerator position is equal to or greater than the predetermined position threshold continues for a predetermined time period.

2. The internal combustion engine start control apparatus according to claim 1, wherein, in the learning process, the one or more processors are configured to determine a proportion, with respect to how many times the accelerator position when the vehicle starts or accelerates becomes equal to or greater than the predetermined position threshold, of how many times the accelerator position becomes less than the predetermined position threshold within a predetermined time threshold after becoming equal to or greater than the predetermined position threshold.

3. The internal combustion engine start control apparatus according to claim 2, wherein, in the internal combustion engine start process, the one or more processors are configured to execute the first start process when the proportion is less than a predetermined proportion threshold, and execute the second start process when the proportion is equal to or greater than the predetermined proportion threshold.

4. The internal combustion engine start control apparatus according to claim 1, wherein, in the second start process, the one or more processors are configured to
set a start suppression mode when the start request for the internal combustion engine is generated,
cancel the set start suppression mode upon establishment of any one of
a condition that a predetermined first time period elapses without the accelerator position becoming less than the predetermined position threshold after the start request for the internal combustion engine is generated,
a condition that the accelerator position becomes less than the predetermined position threshold again before the predetermined first time period elapses after the start request for the internal combustion engine is generated, and thereafter a predetermined second time period elapses without the accelerator position becoming equal to or greater than the predetermined position threshold again, and
a condition that the accelerator position becomes less than the predetermined position threshold again before the predetermined first time period elapses after the start request for the internal combustion engine is generated, and thereafter the accelerator position becomes equal to or greater than the predetermined position threshold again before the predetermined second time period elapses, and
start the internal combustion engine when the set start suppression mode is canceled in a state in which the accelerator position is equal to or greater than the predetermined position threshold.

5. A non-transitory computer readable recording medium containing a computer program to be applied to an internal combustion engine start control apparatus, the internal combustion engine start control apparatus being configured to control start of an internal combustion engine in a vehicle, the vehicle comprising a drive motor and the internal combustion engine as driving force sources, the computer program causing, when executed by one or more processors, the one or more processors to implement a method, the method comprising:
generating a stop request for the internal combustion engine when an accelerator position based on an operation by a driver who drives the vehicle is less than a predetermined position threshold, and a start request for the internal combustion engine when the accelerator position becomes equal to or greater than the predetermined position threshold;
learning an accelerator operation characteristic of the driver exhibited when the vehicle starts or accelerates; and
executing, based on a result of learning the accelerator operation characteristic, a first start process of starting the internal combustion engine when the accelerator position becomes equal to or greater than the predetermined position threshold, and a second start process of starting the internal combustion engine after a state in which the accelerator position is equal to or greater than the predetermined position threshold continues for a predetermined time period.

* * * * *